US005550830A

United States Patent [19]
Kurata et al.

[11] Patent Number: 5,550,830
[45] Date of Patent: Aug. 27, 1996

[54] MULTIPLEX TRANSMISSION APPARATUS AND METHOD

[75] Inventors: Yasuhiko Kurata, Higashihiroshima; Yuichi Akiyama; Osamu Michihira, both of Hiroshima, all of Japan

[73] Assignees: Naldec Corporation; Mazda Motor Corporation, both of Hiroshima, Japan

[21] Appl. No.: 364,392

[22] Filed: Dec. 23, 1994

Related U.S. Application Data

[63] Continuation of Ser. No. 127,366, Sep. 28, 1993, abandoned.

[30] Foreign Application Priority Data

Sep. 30, 1992 [JP] Japan ...................... 4-262327

[51] Int. Cl.⁶ ..................................... H04J 3/12
[52] U.S. Cl. ..................... 370/95.2; 340/825.08
[58] Field of Search .................. 370/95.3, 85.1, 370/85.2, 95.1, 84, 85.8, 85.7, 94.1, 79, 82, 83, 95.2; 340/825.08

[56] References Cited

U.S. PATENT DOCUMENTS

| | | | |
|---|---|---|---|
| 4,689,619 | 8/1987 | O'Brien, Jr. | 340/825.08 |
| 4,763,322 | 8/1988 | Eizenhofer | 370/95.1 |
| 4,891,805 | 1/1990 | Fallin | 370/95.1 |
| 5,090,012 | 2/1992 | Kajiyama et al. | 370/85.3 |
| 5,258,979 | 11/1993 | Oomura et al. | 370/95.1 |
| 5,263,025 | 11/1993 | Torii et al. | 370/95.1 |

FOREIGN PATENT DOCUMENTS

| | | |
|---|---|---|
| 44333788 | 2/1994 | Germany . |
| 4-129347 | 4/1992 | Japan . |

OTHER PUBLICATIONS

German Patent Office Action dated Feb. 21, 1994 (with English translation).

Primary Examiner—Douglas W. Olms
Assistant Examiner—Ajit Patel

[57] ABSTRACT

The number of control nodes, of a plurality of control nodes distributed/connected to a common multiplex transmission path, which can exchange data with each other, is counted and data communication between the plurality of control nodes is performed while each control node prolongs the data transmission period as the number of control nodes, i.e., the number of control nodes which can exchange data with each other, increases.

14 Claims, 6 Drawing Sheets

| S O M (2) | P R I (4) | I D (8) | D A T A (32) | C R C (8) | E O D (1) | A N C (24) | E O M (2) |

MULTIPLEX TRANSMISSION APPARATUS AND METHOD

This application is a continuation of application Ser. No. 08/127,366, filed Sep. 28, 1993, now abandoned.

BACKGROUND OF THE INVENTION

1. Field of the Invention

The present invention relates to a multiplex transmission system having a multiplex transmission path to which a plurality of multiplex nodes are connected.

2. Description of the Related Art

A so-called multiplex transmission system, in which data communication with a large number of control units and the like can be performed through one communication line, is generally known (e.g., Japanese Patent Laid-Open No. 1-143533). Recently, the following multiplex transmission system has been employed locally even in vehicles such as automobiles. According to this system, electronic devices, operation switches, and the like in a vehicle are connected to nodes connected to a multiplex transmission path, and data communication within the vehicle is performed through the nodes and the multiplex transmission path.

The above-described multiplex transmission system is designed to perform data communication between a large number of electronic devices through one communication path, to which a plurality of nodes are generally connected.

In such a multiplex transmission system, for example, each node which is not connected to the power supply is started by connecting it to the power supply. Alternatively, each node may not be started until the ignition key is turned on even if it is connected to the power supply. In this case, each node is started by turning on the ignition key. In either case, as the number of nodes connected to the multiplex transmission path increases, the time required to start the nodes is prolonged.

It is, therefore, required that the time taken to start the nodes at the start time of the system be minimized.

In some known multiplex transmission system, data is output not only at the occurrence of an event, e.g., a switching operation, but also at a predetermined period to always supply data indicating the states of the electronic devices, the switches, and the like connected to the respective nodes to the multiplex transmission path.

In such a type of system, attempts have been made to shorten the period of an output from each node at the start time of the system and restore the output period to the normal period after the system is stabilized. For example, Japanese Patent Laid-Open No. 4-129347 discloses a system in which information is transmitted between the respective control units at a predetermined period, and information is transmitted at a period shorter than the predetermined period at the start time of an engine.

As described above, by shortening the period of an output from each node at the start time of the system, the time required to start each node at the start time of the system can be shortened.

If, however, the period is excessively shortened, the traffic intensity of the multiplex transmission path is excessively increased. As a result, it takes much time to transmit/receive information, or necessary information may not be transmitted/received.

SUMMARY OF THE INVENTION

It is an object of the present invention to provide a multiplex transmission system which can quickly start each multiplex node at the start time of the system without excessively increasing the traffic intensity of a multiplex transmission path.

In order to achieve the above object, according to a first aspect of the present invention, there is provided a multiplex transmission apparatus in which a plurality of control nodes distributed/connected to a common multiplex transmission path exchange data with each other, comprising counting means for counting the number of control nodes, of the plurality of control nodes, which can exchange data with each other, and period control means for prolonging a data transmission period in each control node as the number of the control nodes increases.

According to a second aspect of the present invention, there is provided a multiplex transmission method of exchanging data between a plurality of control nodes distributed/connected to a common multiplex transmission path, comprising the steps of counting the number of control nodes, of the plurality of control nodes, which can exchange data with each other, and prolonging a data transmission period in each control node as the number of the control nodes increases.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Embodiments of the present invention will be described in detail below with reference to the accompanying drawings.

Figure 1:
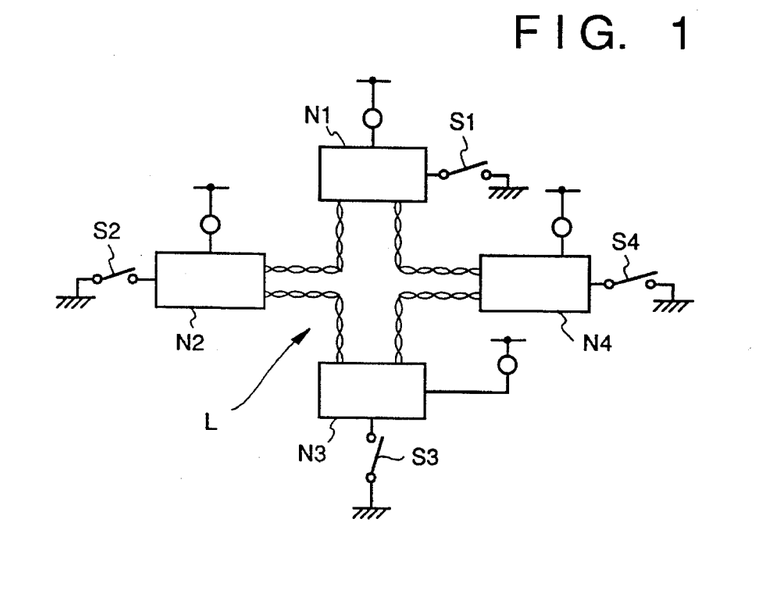
FIG. 1 is a block diagram showing the overall arrangement of a multiplex transmission system according to a preferred embodiment of the present invention.

As shown in FIG. 1, in a multiplex transmission system according to a preferred embodiment of the present invention, for example, four nodes N1 to N4 are connected to a multiplex transmission line L, and switches or switch groups S1 to S4 are respectively connected to the nodes N1 to N4. Although not shown, various types of electronic devices are also connected to the nodes N1 to N4.

Figure 2:
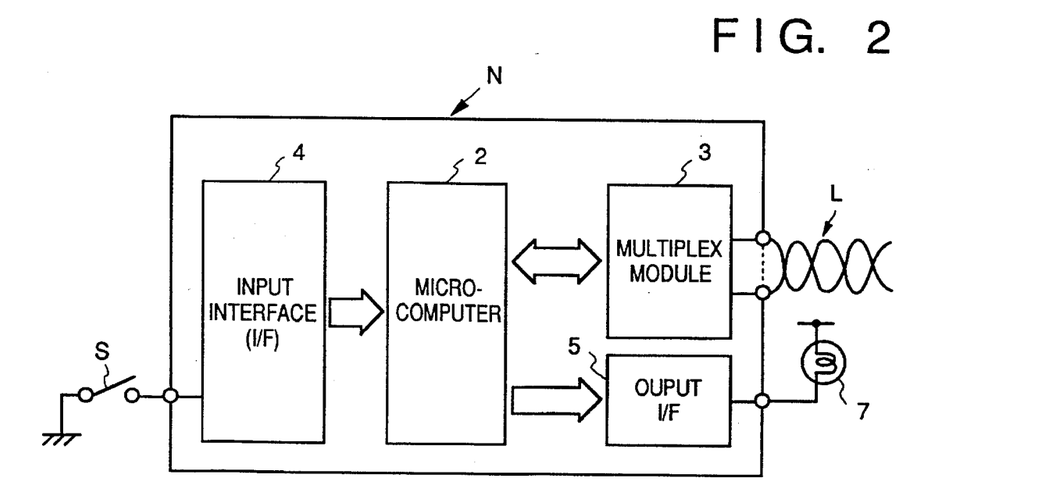
FIG. 2 is a block diagram showing a schematic arrangement of a multiplex node according to the preferred embodiment.

As shown in FIG. 2, each (N) of the multiplex nodes N1 to N4 is constituted by a microcomputer 2, a multiplex module 3 including an LSI for multiplex communication as a main part, and interfaces 4 and 5 respectively arranged on the input side and the output side. For example, a switch S is connected to the input interface 4, and an electronic device 7 operated by the switch S is connected to the output interface 5.

The multiplex node N (N1 to N4) is connected to the multiplex transmission line L through the multiplex module 3. The multiplex node N transmits data to another node through the multiplex transmission line L according to a message format such as the one shown in FIG. 3.

Figure 3:
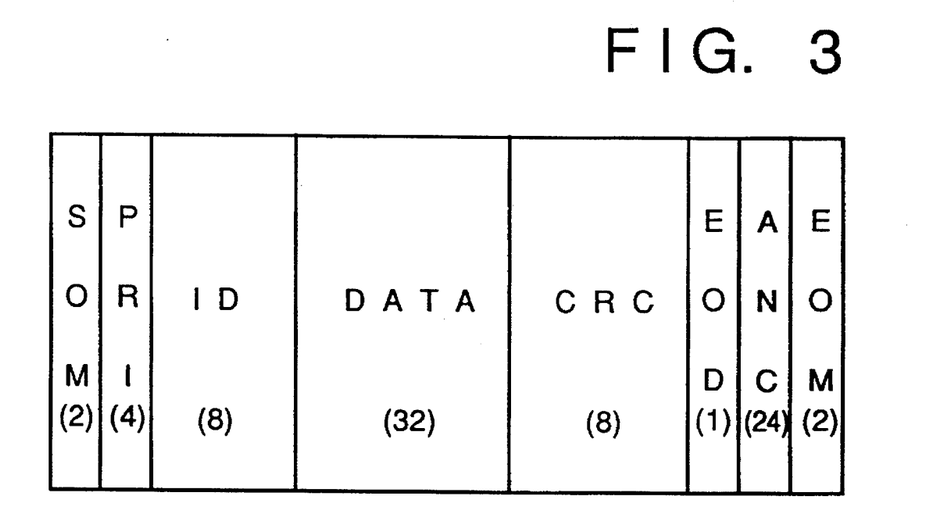
FIG. 3 is a view showing a message format of data transmitted by each multiplex node according to the preferred embodiment.

Referring to FIG. 3, each frame indicated by letters represents the following contents. In addition, the number in the parentheses below each letter code represents the number of bits given to each frame.

SOM: the start of a message

PRI: the priority order of a signal

ID: the frame inherent to each node (indicating the source and characteristics of data)

DATA: the contents of data (e.g., switch ON/OFF state)

CRC: an error detection code

EOD: the end of data

ANC: an acknowledgement signal (a signal for informing that data is properly received)

EOM: the end of data

According to the preferred embodiment, at the start time of the above-described multiplex transmission system, in order to quickly start the respective multiplex nodes N1 to N4 without excessively increasing the traffic intensity of the multiplex transmission line L, each of the nodes N1 to N4 is set such that the data transmission period is prolonged every time the number of other multiplex nodes with which each node can exchange data is increased.

Data communication at the start time of the multiplex transmission system of the embodiment will be described next with reference to the flow chart in FIG. 4 and the timing charts in FIGS. 5A–5D. Assume that in the preferred embodiment, the node N1 of the four nodes N1 to N4 is started first.

When the system is started, the node N1, which is started first, starts transmission of the inherent frame (step #1), and loads an acknowledgement signal (ANC) for this transmission (step #2).

Subsequently, the number of ANCs received is checked (steps #3, #5, and #7). If the ANC count is 0 (YES in step #3), since none of the remaining modes have been started, the node N1 keeps transmitting the inherent frame in a time interval t1 (e.g., t1=5 msec) from the preceding transmission. In this case, since only the node N1 is operated, the transmission interval t1 of the inherent frame is minimized, that is, the traffic intensity of the multiplex transmission line L is maximized.

If the ANC count becomes 1 (YES in step #5), since only one of the remaining nodes (e.g., the node N2) is started and connected to the multiplex transmission line L, the node N1 sets the transmission interval of the inherent frame to be slightly longer than the transmission interval t1, and performs transmission in a time interval t2 (e.g., t2=10 msec) from the preceding transmission (step #6). Note that the node N2 receives one ANC after it is started, and hence starts transmitting the inherent frame in this period t2.

If the ANC count becomes 2 (YES in step #7), since two of the remaining nodes (e.g., the nodes N2 and N3) are started and connected to the multiplex transmission line L, the node N1 sets the transmission interval of the inherent frame to be longer than the time interval t2, and performs transmission in a time interval t3 (e.g., t3=30 msec) from the preceding transmission (step #8).

Note that the transmission interval in the node N2 is also prolonged to the interval t3. In addition, the newly started node N3 also starts transmitting the inherent frame in the period t3.

If the ANC count becomes 3 (NO in step #7), since all the remaining nodes are started, the node N1 further prolongs the transmission interval of the inherent frame, and performs transmission in a time interval t4 (e.g., t4=40 msec) from the preceding transmission (step #9).

At this time, the transmission interval in the nodes N2 and N3 are also prolonged to the time interval t4. In addition, the newly started node N4 starts transmitting the inherent frame at the period t4.

This transmission interval t4 is a standard transmission period in a normal operation of the system.

The timing charts shown in FIGS. 5A–5D shows a state wherein the transmission period of the inherent frame of each of the nodes N1 to N4 is prolonged every time the number of ANCs received from other nodes is increased.

Referring to FIGS. 5A–5D, each upward solid arrow indicates output of an inherent frame, and the broken straight lines indicate the start times of the nodes N2, N3, and N4, respectively. In addition, the alternate long and short dashed line indicates the timing at which starting of the system is completed.

Figure 4:
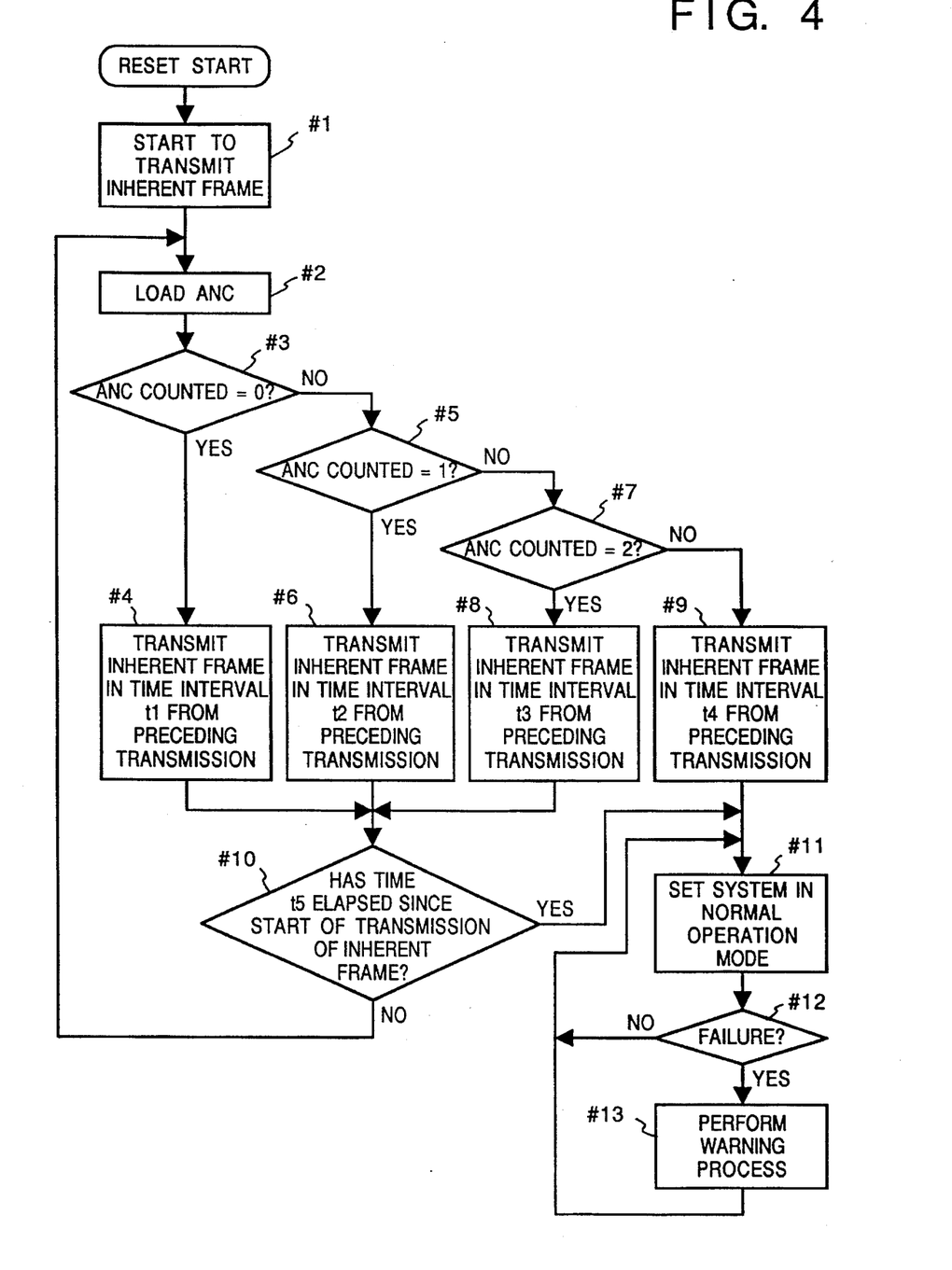
FIG. 4 is a flow chart explaining data communication at the start time of the multiplex transmission system according to the preferred embodiment.
Figure 5A:
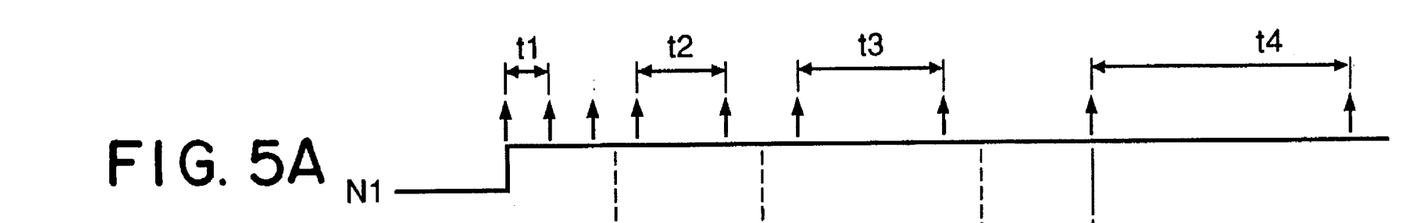
FIGS. 5A–5D is a timing chart for explaining data communication at the start time of the multiplex transmission system according to the preferred embodiment.
Figure 5B:
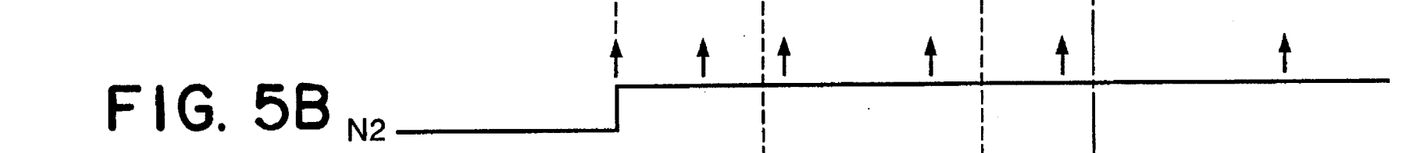
Figure 5C:
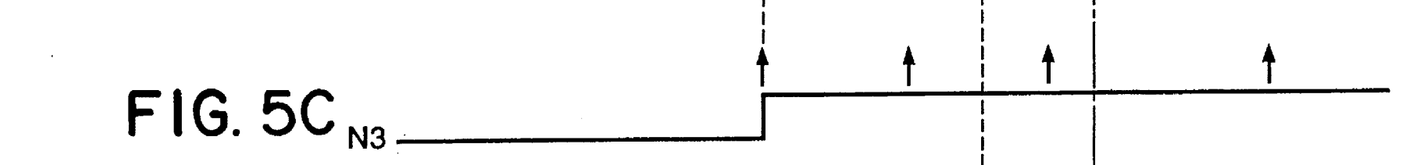
Figure 5D:
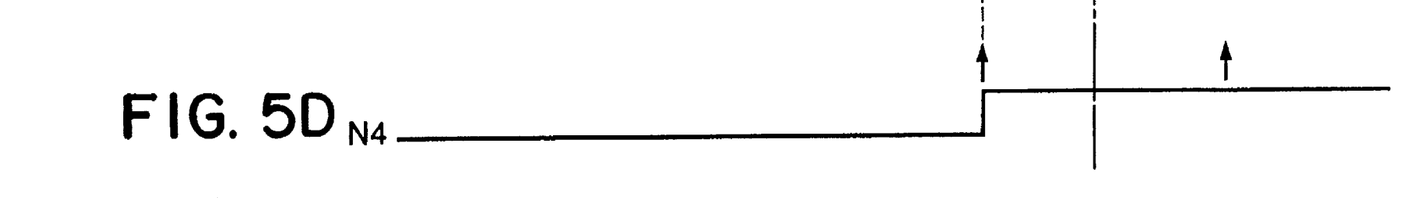

When starting of all the nodes N1 to N4 is completed in the above-described manner, the system is set in the normal operation mode (step #11 in FIG. 4). Subsequently, the system maintains the normal operation as long as no failure occurs (NO in step #12). If any failure occurs (YES in step #12), a predetermined warning process is performed (step #13).

Note that if the ANC count does not become 3 even when a predetermined period of time t5 (e.g., t5=1.0 sec) has elapsed (YES in step #10), i.e., all the nodes are not started, a node that is not started is determined as a "down" node, and the system is set in the normal operation mode. In this case, however, since the ANC count does not reach a proper count, occurrence of a failure is determined, and a warning process is performed.

As described above, according to the embodiment, at the start time of the system, each of the multiplex nodes N1 to N4 prolongs the data transmission period every time an acknowledgement signal (ANC) from another multiplex node with respect to data transmission is newly received, i.e., the number of other multiplex nodes with which each node can exchange data is increased. Therefore, the respective nodes N1 to N4 can be quickly started at the start time of the system so as to smoothly shift the system to the normal operation mode without excessively increasing the traffic density of the multiplex transmission line L.

In addition, since the data transmission period is changed in accordance with the number of nodes with which each node can exchange data, the multiplex transmission line L is free from excessively low or high traffic density, and the reliability and efficiency of data communication can be improved.

In the above-described embodiment, the transmission period in a given node is prolonged every time an acknowledgement signal (ANC) from another node with respect to data transmission is newly received. Instead of this operation, the data transmission period in a given node may be prolonged every time the given node is started to newly receive data inherent to another multiplex node.

Figure 6:
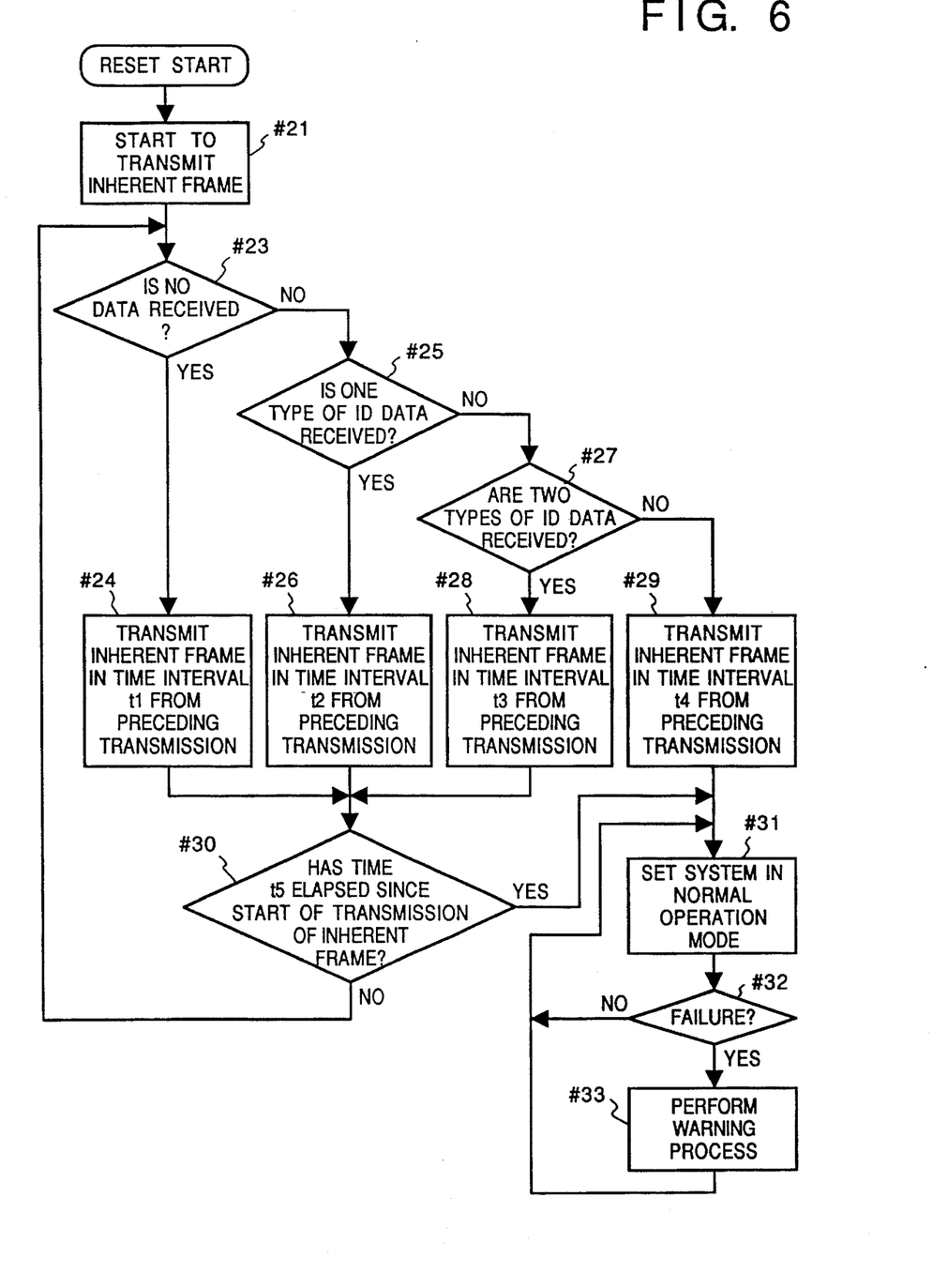
FIG. 6 is a flow chart for explaining data communication at the start time of a multiplex transmission system according to a second embodiment of the present invention.
Figure 7A:
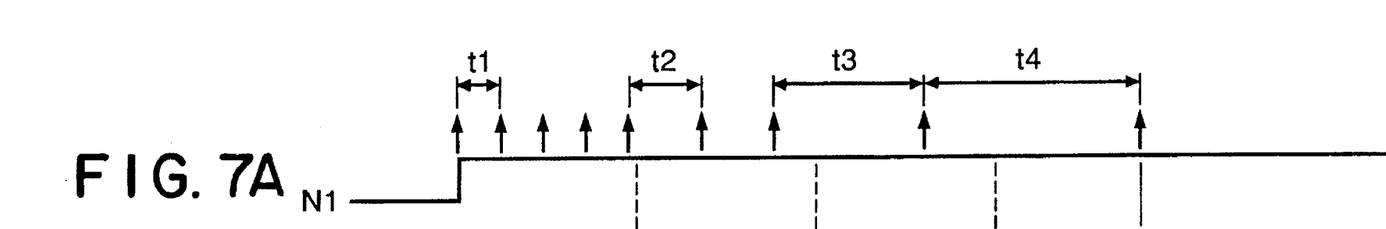
FIGS. 7A–7D is a timing chart for explaining data communication at the start time of the multiplex transmission system according to the second embodiment.
Figure 7B:
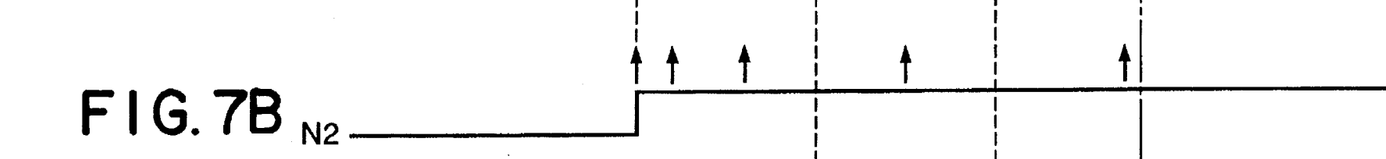
Figure 7C:
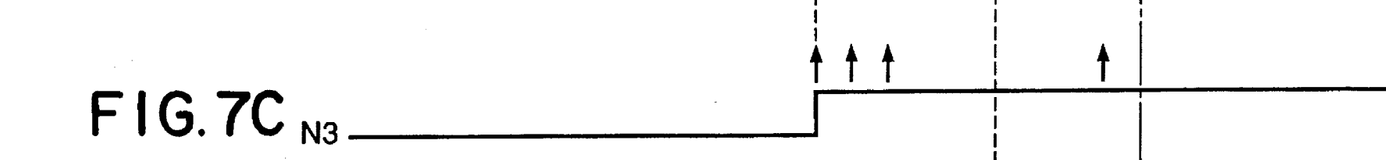
Figure 7D:
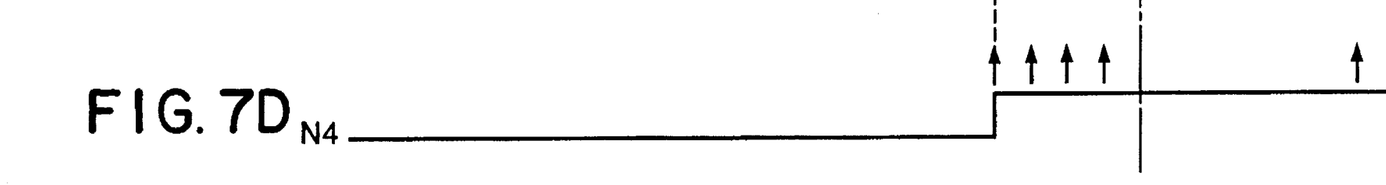

According to a second embodiment of the invention, as shown in the flow chart in FIG. 6, instead of checking the number of ANCs received as in the above-described embodiment, the number of inherent frames (IDs) received is checked (steps #23, #25, and #27). As the number of IDs is increased, the data transmission period is prolonged from a time interval t1 to a time interval t4 (steps #24, #26, #28, and #29).

The flow chart in FIG. 6 is the same as that in FIG. 4 except that the step of loading an ANC is omitted, and the number inherent of frames (IDs) received is checked instead of checking an ANC count, and hence a detailed description thereof will be omitted.

FIGS. 7A–7D show is a timing chart showing a case wherein every time the number of inherent frames received by each of nodes N1 to N4 from another node is increased, the data transmission period is prolonged in this embodiment. Referring to FIGS. 7A–7D, each upward solid arrow indicates output of an inherent frame (data), and the broken straight lines indicate the start times of the nodes N2, N3, and N4, respectively. In addition, the alternate long and short dashed line indicates the timing at which starting of the system is completed.

Similar to the above-described embodiment, in this embodiment, at the starts time of the system, each of the multiplex nodes N1 to N4 prolongs the data transmission period every time an inherent frame (data) from another multiplex node with respect to data transmission is newly received, i.e., the number of other multiplex nodes with which each node can exchange data is increased. Therefore, the same effects as those of the above-described embodiment can be obtained.

As many apparently widely different embodiments of the present invention can be made without departing from the spirit and scope thereof, it is to be understood that the invention is not limited to the specific embodiments thereof except as defined in the appended claims.

What is claimed is:

1. A multiplex transmission apparatus in which a plurality of control nodes connected to a common multiplex transmission path exchange data with each other, comprising:

counting means, located in each of said plurality of control nodes, for counting a number of control nodes which are in a state of being able to exchange data with each other; and period control means, located in each of said plurality of control nodes, for prolonging a period during which each of said control nodes in said state performs a data transmission as said number of control nodes increases, wherein said period control means prolongs the period to regulate data communication density in the common multiplex transmission path.

2. The apparatus according to claim 1, further comprising means for determining, when said counting means counts a predetermined number of control nodes, that each of said predetermined number of control nodes can exchange data with each other, and for controlling each of said predetermined number of control nodes to perform a normal communication after being activated to start.

3. The apparatus according to claim 1, wherein said period control means determines said period so that a data communication density in the multiplex transmission path becomes a maximum density, which is determined by communication capacity of said multiplex transmission path, when the number of said plurality of control nodes which are capable of exchanging data is one.

4. A method of exchanging data between a plurality of control nodes connected to a common multiplex transmission path, comprising the steps of:

counting the number of control nodes which are in a state of being able to exchange data with each other; and prolonging a data transmission period in each control node as said number of control nodes increases to avoid an excessively high data communication density in the common multiplex transmission path.

5. The method according to claim 4, further comprising a step of determining, when a predetermined number of control nodes are counted in said counting step, that each of said predetermined number of control nodes can exchange data with each other, and of controlling each of said predetermined number of control nodes to perform a normal communication after being activated to start.

6. The method according to claim 4, wherein said period is determined so that a data communication density in the common multiplex transmission path becomes a maximum density, which is determined by communication capacity of said common multiplex transmission path, when said number of control nodes which are capable of exchanging data is one.

7. A multiplex transmission apparatus in which a plurality of control nodes connected to a common multiplex transmission path exchange data with each other, comprising:

counting means, located in each of said plurality of control nodes, for counting a number of control nodes which are in a state of being able to exchange data with each other; and period control means, located in each of said plurality of control nodes, for prolonging a data transmission period of each of said control nodes which are in said state, wherein said period becomes longer as said number of control nodes increases.

8. The apparatus according to claim 7, wherein said plurality of control nodes generate acknowledgement signals acknowledging a predetermined data transmission, and said counting means counts a number of acknowledgement signals from another control node with respect to the predetermined data transmission, said number indicating the number of control nodes which are in said state.

9. The apparatus according to claim 7, wherein said counting means counts a number of received data inherent to another control node with respect to a predetermined data transmission, and regards said number as the number of control nodes which are in said state.

10. A control node in a multiplex transmission apparatus having a plurality of control nodes, comprising:

counting means for counting a number of control nodes which are in a state of being able to exchange data with each other; and period control means for prolonging a data transmission period for the control node according to the number of control nodes which are in said state.

11. A multiplex transmission apparatus in which a plurality of control nodes connected to a common multiplex transmission path exchange data with each other, comprising:

acknowledgement generating means, located in each of said plurality of control nodes, for generating acknowledgement signals acknowledging a predetermined data transmission;

counting means, located in each of said plurality of control nodes, for counting a number of control nodes which are in a state of being able to exchange data with each other according to a number of acknowledgement signals received from other control nodes; and period control means, located in each of said plurality of control nodes, for prolonging a period during which each of said control nodes in said state performs a data transmission as said number of acknowledgement signals counted increases, wherein said period control means prolongs the period to regulate data communication density in the common multiplex transmission path.

12. A multiplex transmission apparatus in which a plurality of control nodes connected to a common multiplex transmission path exchange data with each other, comprising:

counting means, located in each of said plurality of control nodes, for counting a number of received data inherent to another control node with respect to a predetermined data transmission, said number of received data inherent to another control node indicating the number of control nodes which are in a state of being able to exchange data with each other; and period control means, located in each of said plurality of control nodes, for prolonging a period during which each of said control nodes in said state performs a data transmission every time said number of received data increases, wherein said period control means prolongs the period to regulate data communication density in the common multiplex transmission path.

13. A method of exchanging data between a plurality of control nodes connected to a common multiplex transmission path, comprising the steps of:

generating acknowledgement signals acknowledging a predetermined data transmission, in each of said plurality of control nodes;

counting, in each of said plurality of control nodes, a number of control nodes which are in a state of being able to exchange data with each other according to a number of acknowledgement signals received from other control nodes; and prolonging, in each of said plurality of control nodes, a period during which each of said control nodes in said state performs a data transmission as said number of acknowledgement signals counted increases, wherein the period is prolonged so as to regulate data communication density in the common multiplex transmission path.

14. A method of exchanging data between a plurality of control nodes connected to a common multiplex transmission path, comprising the steps of:

counting, in each of said plurality of control nodes, a number of received data inherent to another control node with respect to a predetermined data transmission, said number of received data inherent to another control node indicating the number of control nodes which are in a state of being able to exchange data with each other; and prolonging, in each of said plurality of control nodes, a period during which each of said control nodes in said state performs a data transmission every time said number of received data increases, wherein the period is prolonged so as to regulate data communication density in the common multiplex transmission path.

* * * * *

UNITED STATES PATENT AND TRADEMARK OFFICE
CERTIFICATE OF CORRECTION

PATENT NO. : 5,550,830
DATED : August 27, 1996
INVENTOR(S) : Yasuhiko KURATA et al.

It is certified that error appears in the above-indentified patent and that said Letters Patent is hereby corrected as shown below:

ON THE COVER

Section [56], "FOREIGN PATENT DOCUMENTS", line 1, change

"44333788" to --P4333378.8-31--.

Signed and Sealed this

Eighth Day of April, 1997

*Attest:*

BRUCE LEHMAN

*Attesting Officer*      *Commissioner of Patents and Trademarks*